United States Patent

[11] 3,614,639

[72] Inventor Harris J. Belman
Rockville, Md.
[21] Appl. No. 846,112
[22] Filed July 30, 1969
[45] Patented Oct. 19, 1971
[73] Assignee International Business Machines Corporation
Armonk, N.Y.

[54] FSK DIGITAL DEMODULATOR WITH MAJORITY DECISION FILTERING
10 Claims, 4 Drawing Figs.

[52] U.S. Cl. .......... 329/104, 178/66, 325/320, 329/109, 329/126
[51] Int. Cl. .......... H04l 27/14
[50] Field of Search .......... 329/104, 109, 110, 126, 135; 325/30, 320; 178/66, 67; 328/109

[56] References Cited

UNITED STATES PATENTS

| | | | |
|---|---|---|---|
| 3,230,457 | 1/1966 | Soffel | 325/320 |
| 2,882,338 | 4/1959 | Wozencraft | 178/69 |
| 3,037,568 | 6/1962 | Hannum | 179/15 |
| 3,233,181 | 2/1966 | Calfee | 329/128 |
| 3,344,353 | 9/1967 | Wilcox | 328/115 X |
| 3,366,930 | 1/1968 | Bennett et al. | 340/172.5 |
| 3,422,357 | 1/1969 | Browne | 325/56 X |
| 3,348,153 | 10/1967 | Featherston | 325/320 |
| 3,505,470 | 4/1970 | Gorog | 325/30 X |

OTHER REFERENCES

Deutsch, et al. " Digital Filter For Delta Demodulation" Vol. 10, No. 4, Sept. 1967 p. 370– IBM Technical Disclosure Bulletin.

*Primary Examiner*—Alfred L. Brody
*Attorneys*—Hanifin and Jancin and Maurice H. Klitzman

ABSTRACT: A digital FSK demodulator including frequency detecting circuits, temporary storage, and a majority detector. A plurality of the most recent data bits from the frequency detecting circuits are stored and an output is generated by the majority detector which is a mark if the majority of stored bits are marks, and a space if the majority of stored bits are spaces.

INVENTOR.
HARRIS J. BELMAN
BY Maurice H. Klitzman
ATTORNEY

FSK DIGITAL DEMODULATOR WITH MAJORITY DECISION FILTERING

BACKGROUND OF THE INVENTION

This invention relates to apparatus for demodulation of frequency shifted keyed signal commonly called FSK signals. FSK signals consist of a carrier wave which is transmitted at two or more frequencies, a first frequency $F_m$ may be referred to as the mark frequency, and a second frequency $F_s$ may be referred to as the space frequency. The message to be transmitted consists of a series of binary ones and zeros which can alternatively be labeled marks and spaces. The transmitter transmits the message by sending out the carrier frequency $F_m$ or $F_s$ for a predetermined length of time for each binary bit. After the FSK signal is received by the receiver, it must be demodulated into binary bits in order that the digital decoding circuits can operate on the signal to extract the encoded message or data contained in the FSK signal.

Analog demodulators of the prior art were capable of rejecting noise through the use of either passive or active filters. Passive filters are usually large and heavy. Active filters use linear amplifiers which tend to be temperature sensitive, and may require adjustments or tuning. For these reasons analog filters are not well suited for either extreme environments or automated mass production.

The digital demodulators of the prior art are stable with temperature, and, therefore, are well suited for applications in extreme environments, however, those relatively inexpensive and uncomplicated digital demodulators of the prior art tend to be more sensitive to noise. The signal to noise rejection ratio of prior art digital demodulators has been kept to an acceptable level by adding external analog type filters at the output, or resorting to relatively complex and more expensive detection systems.

SUMMARY OF THE INVENTION

The object of this invention is to provide a new digital frequency shift keyed signal demodulator which has an adequate noise tolerance yet requires a minimum of components.

The invention is realized by specially adapting a digital matched filter, so as to operate as a majority decision filter and combining the special digital matched filter with digital frequency detecting circuits in such a manner so as to produce an efficient frequency shift keyed signal demodulator.

DESCRIPTION OF PREFERRED EMBODIMENTS

Figure 1:
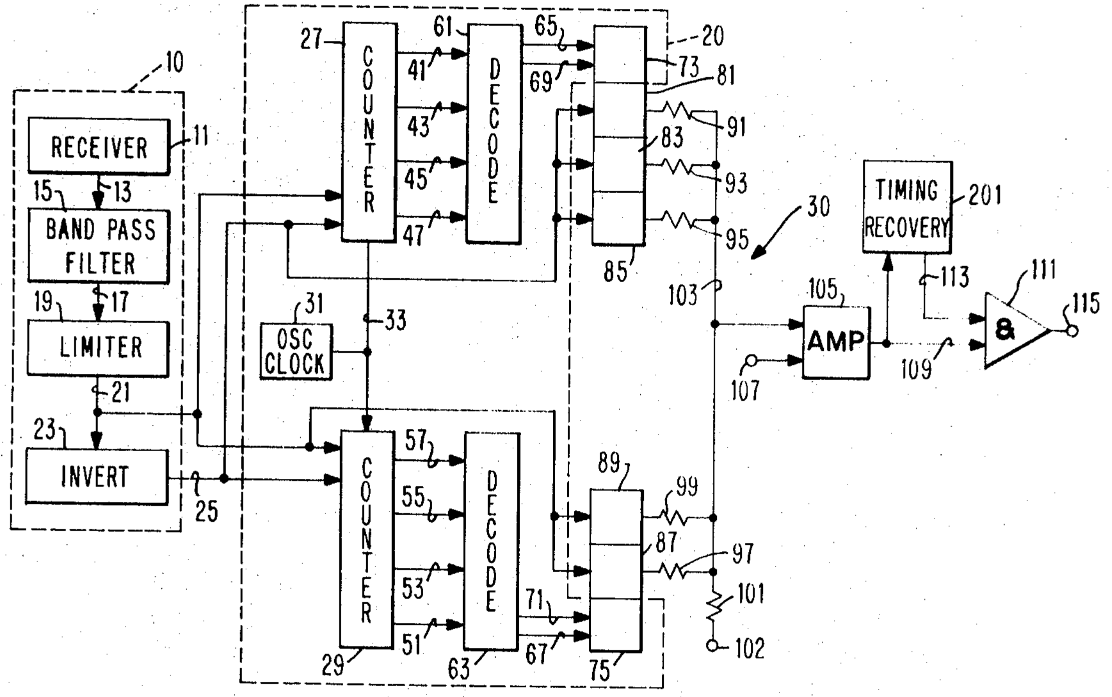
FIG. 1 shows a preferred embodiment of the invention which utilizes two counting circuits to provide frequency determination. The first counting circuit determines the frequency of the positive half cycles of the input signal and the second counting circuit determines the frequency of the negative half cycles of the input signal. The majority decision filter is divided into two sections, and one section is connected to each counter.

Referring to FIG. 1 of the drawings, control circuitry 10 includes receiver 11, filter 15, limiter 19, and inverter 23. Receiver 11 receives the frequency shift keyed (FSK) signal. The FSK signal may be directly received by receiver 11 from a transmission line or it may have been received via a radio or other communications link, and further the FSK signal itself may have been modulated onto a carrier frequency in the form of amplitude or frequency modulation. If necessary, receiver 11 provides amplitude or frequency demodulation and the output of receiver 11 is a frequency shift keyed signal which may typically consist of a mark frequency $F_m$ of 1,200 cycles per second and a space frequency $F_s$ of 1,800 cycles per second. The typical data transmission rate may be 600bits per second.

The output 13 of receiver 11 is passed through a band-pass filter 15 which typically would have a band pass from 1,100to 1,900cycles per second. Band-pass filter 15 reduces the amplitude of signals below the mark frequency and above the space frequency to amplitudes which are below the threshold of limiter 19. Band-pass filter 15 may in some instances be an integral part of receiver 11.

The output 17 of band-pass filter 15 is received by limiter 19 which is a high gain amplifier such as a Schmitt-Trigger, or a voltage comparator such as MA710C manufactured by "-Fairchild Camera and Instrument Corporation" of Mountain View, Calif. The output of limiter 19 is a bilevel signal and appears on wire 21. The output of limiter 19 is at a positive digital level, such as zero volts, when the input to limiter 19 is below the switching threshold. The output of limiter 19 is routed via wire 21 to inverter 23 which in turn provides an output on wire 25 which is substantially of opposite phase to the signal on wire 21. Due to propagation delay inherent in a practical inverter such as inverter 23, the output on wire 25 may be slightly more than 108° out of phase with the signal on wire 21, however, this does not affect the system operation.

The output of limited 19 is also connected via wire 21 to the enable gate of binary counter 27 and the reset gate of binary counter 29. The output of inverter 23 is connected via wire 25 to the reset gate of binary counter 27 and to the enable gate of binary counter 29.

Detector 20 converts the bilevel frequency modulated signal created by limiter 19 of control 10 into a bilevel amplitude modulated signal comprising a plurality of digital pulses. Each pulse corresponds to the detection of a bilevel frequency modulated half cycle of width greater than a predetermined time which is less than one-half the period of a mark frequency cycle but greater than one-half the period of a space frequency cycle. In order to accomplish the above described half cycle width detection, detector 20 includes time measuring means in the form of binary counters 27 and 29 driven by clock 31, as well as decodes 61 and 63 and latch storage circuits 73 and 75.

Oscillator clock 31 is connected to the clock inputs of binary counters 27 and 29 via wire 33. Whenever wire 21 is at a positive digital level, binary counter 27 is enabled and advances with each clock cycle of oscillator clock 31 while binary counter 29 is held reset by the positive digital level from wire 21 on the reset gate of binary counter 29.

Each of binary counters 27 and 29 contain four counting stages and thus are able to count from zero through decimal number 15. Each of the counting stages of binary counter 27 is connected to decode logic 61 via wires 41, 43, 45, and 47. Similarly each of the counting stages of binary counter 29 is connected to decode 63 via wires 51, 53, 55, 57.

The frequency of oscillator clock 31 must be greater than $3(1/F_m-1/F_s)$ for proper operation. A typical clock frequency might be 38.4kc. when 1.2 kc. and $F_s$=1.8 kc. Decode 61 consists of digital logic AND-OR circuits connected in a well-known manner such that a positive digital level appears on output wire 65 whenever the digital count in binary counter 27 is equal to decimal number 13. Similarly, decode 63 provides a positive digital level on output wire 67 whenever the digital count in binary counter 29 equals a decimal 13. Decode 61 provides a positive digital level on output wire 69 whenever the count in counter 27 equals zero. Decode 63 provides a positive digital level on wire 71 whenever the count in counter 29 equals zero.

Latch circuit 73 is controlled by decode 61 via set wire 65 and reset wire 69. Latch 75 is controlled by decode 63 via set wire 67 and reset wire 71. Whenever the contents of either binary counter 27 or 29 reaches a decimal number 13, latches 73 and 75 are set. Whenever the count in binary counters 27 or 29 is zero, latches 73 or 75 are reset.

The on and off outputs of latch 73 are connected to the gate inputs shift register stage 81 of majority decision filter 30. In like manner the on and off outputs of latch 75 are connected to the gate inputs shift register stage 87.

Majority decision filter 30 consists of shift register stages 81 through 89, resistors 91 through 99 and 101, and differential amplifier 105. The on and off outputs of each shift register stage are connected to the gate inputs of the following stage. Thus, the outputs of stage 81 are connected to stage 83 and the outputs of stage 83 are connected to stage 85 and the outputs of stage 87 are connected to stage 89. The output of inverter 23 on wire 25 is connected to the shift input of each of stages 81, 83, and 85. The output of limiter 19 on wire 21 is connected to the shift input on each of stages 87 and 89.

The on output of each shift register stage is also connected to an associated resistor. The resistors in combination with amplifier 105 comprise a majority decision circuit. The on output of shift register stage 81 being connected to resistor 91 the on output of stage 83 being connected to resistor 93, the on output of stage 85 being connected to resistor 95, the on output of stage 87 being connected to resistor 97 and on output stage 89 being connected to resistor 99. The opposite terminals of resistors 91, 93, 95, 97, and 99 are connected together into one node and also connected to resistor 101, with wire 103. The opposite terminal of resistor 101 is connected to a zero voltage reference 102.

Figure 4:
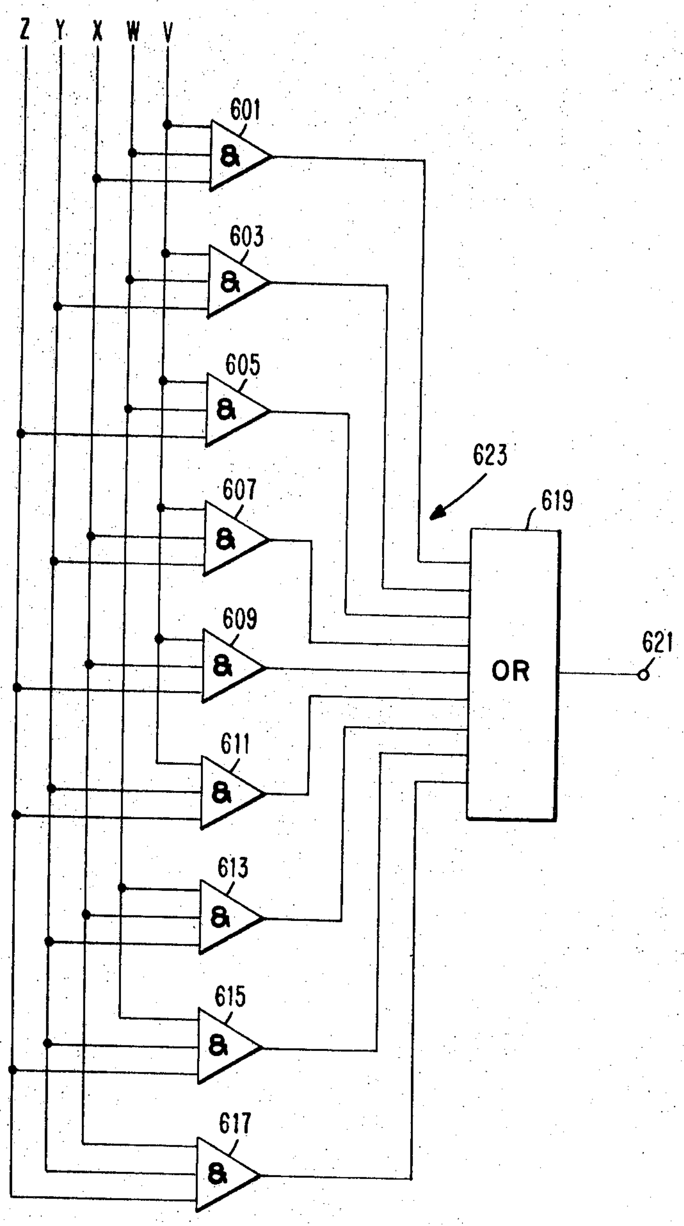
FIG. 4 shows a digital majority decision circuit.

Wire 103 is also connected to the noninverting input of differential amplifier 105. The inverting input to differential amplifier 105 is connected to voltage reference source 107. The voltage of source 107 will typically be some value between zero volts and the typical positive digital level of 6 volts. The resistor network and threshold detector amplifier is but one method of implementing a majority decision circuit. An alternate completely digital method is shown in FIG. 4. Inputs V, W, X, Y, and Z would be connected to the on outputs of shift register stages 81, 83, 85, 87, and 89, in place of the resistors shown in FIG. 1. Logical AND circuits 601, 603, 605, 607, 609, 611, 613, 615, and 617 are responsive to each of the possible combinations of three shift register stages out of five being in the on condition. Logical OR circuit 619 provides an output on wire 621 whenever three out of five shift register stages are in the logical on condition. Output 621 would be used in place of output 109 if the digital circuit of FIG. 4 were used in place of the majority decision circuit 30 in FIG. 1. The output of differential amplifier 105 is connected via wire 109 to the input of timing recovery 201 and to one input of logical AND block 111. Timing recovery 201 may be any one of several well-known circuits which exist in the art. A typical example is a digital circuit such as shown on page 716 of IBM Technical Disclosure Bulletin, Vol. 10, No. 6, Nov. 1967. The output of timing recovery 201 is connected via wire 113 to the other input of logical AND block 111. The demodulated digital signal appears at the output 109 of differential amplifier 105, and the recovered digital information is available at the output 115 of logical AND block 111, in a condition suitable for decoding.

OPERATION

Figure 3:
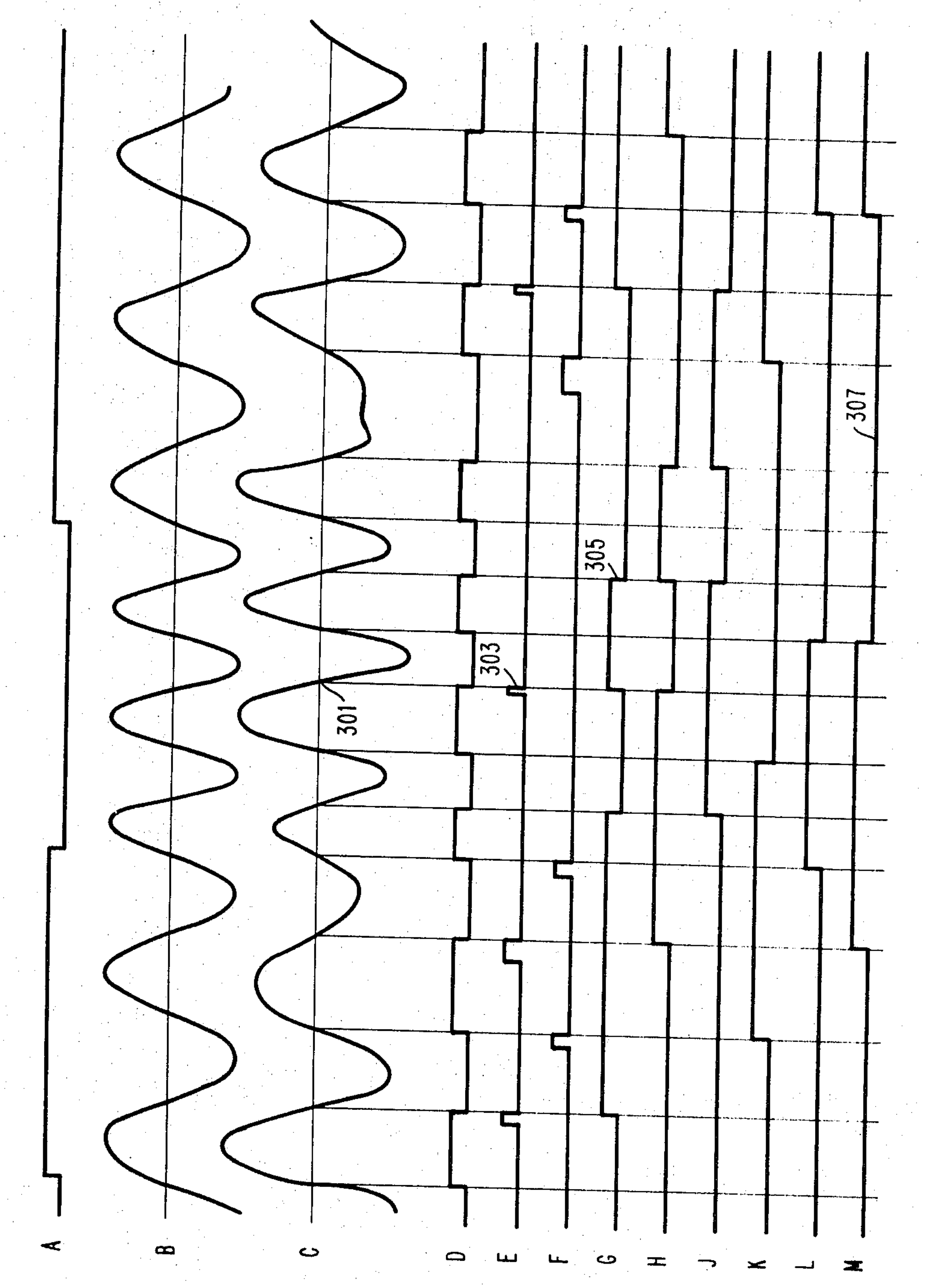
FIG. 3 shows a typical voltage waveforms as a function of time which can be expected at various nodes within the system.

Referring now to FIG. 3, waveform A shows the digital data to be transmitted from some remote source, and waveform B shows that same data in the form of a frequency shift keyed signal. Waveform B may be transmitted in its present form or it may be used to modulate a carrier frequency. After waveform B has been transmitted and received, it will include the basic FSK signal plus noise. Referring to FIG. 1 in conjunction with FIG. 3, the distorted FSK signal is received at receiver 11 and filtered by band-pass filter 15 resulting in a waveform such as waveform C of FIG. 3. This filtered FSK signal which has significant noise of frequencies between the space and mark frequencies but substantially reduced noise components outside of this frequency band, is passed through limiter 19 whose output 21 is waveform D as shown in FIG. 3. Binary counter 27 counts under control of oscillator clock 31 whenever the output of limiter 19 is at a positive digital level. The digital count of binary counter 27 is decoded by decoder 61 to set latch 73 to a logical "one" state whenever the count in counter 27 reaches 13indicating that a mark frequency is being received. If the incoming positive half cycle is not wide enough to allow time for binary counter 27 to reach a count of 13, latch 73 is not set indicating that the space frequency is being received. The output waveform of latch 73 is shown as waveform E in FIG. 3. When waveform D returns to a negative digital level, the information stored in latch 73 as a logical state is shifted into shift register stage 81, and binary counter 27 is reset to zero which in turn causes decode 61 to generate a reset signal on wire 69 resetting latch 73 to its logical zero state. The on output of shift register stage 81 is shown as waveform G in FIG. 3. Subsequent negative transition of waveform D will shift the mark or space information stored in shift register stage 81 into the following stages 83 and 85. The on output of stage 83 is waveform H, and the or output of stage 85 is waveform J in FIG. 3. Whenever waveform D is at its negative digital level counter 29 is advanced by oscillator clock 31, since binary counter 29 is enabled by output 23. If the incoming negative half cycle of the FSK signal is sufficiently wide so that waveform D is at its negative digital level long enough to allow oscillator clock 31 to advance counter 29 to a count of 13, decode 63 will set latch 75 indicating that a mark frequency is being received. The on output of latch 75 is shown as waveform F in FIG. 3. When waveform D returns to a positive digital level, the mark or space information stored in latch 75 is shifted into shift register stage 87, and counter 29 is reset to zero which in turn resets latch 75. The on output of shift register stage 87 is shown as waveform K in FIG. 3. Subsequent positive transition of waveform D will shift mark or space information stored in shift register stage 87 into shift register stage 89. The on output of stage 89 corresponds to waveform L in FIG. 3.

The values of resistors 91, 93, 95, 97, 99, and 101 are chosen such that whenever three or more of the shift register stages in digital matched filter 30 are in the on condition indicating that mark frequencies have been received, the voltage at wire 103 is above reference voltage 107. Whenever two or less shift register stages are the same as saying that three or more are in an off condition, indicating that space frequencies are being received, the voltage at wire 103 is less than reference voltage 107. The output of differential amplifier 105 appears on wire 109 and corresponds with waveform M shown in FIG. 3. The output of differential amplifier 105 is at a positive digital level whenever input at wire 103 is above the reference voltage 107 and at a negative digital level whenever the voltage at wire 103 is below the reference voltage 107.

The filtering action of the shift register and majority decision network are clearly shown in FIG. 3. Numerals 301 and 303 show an erroneous detection caused by noise distortion. Numeral 305 shows the error loaded into the shift register and numeral 307 refers to the corrected output generated by the majority decision circuit.

ALTERNATIVE EMBODIMENT, DESCRIPTION AND OPERATION

Figure 2:
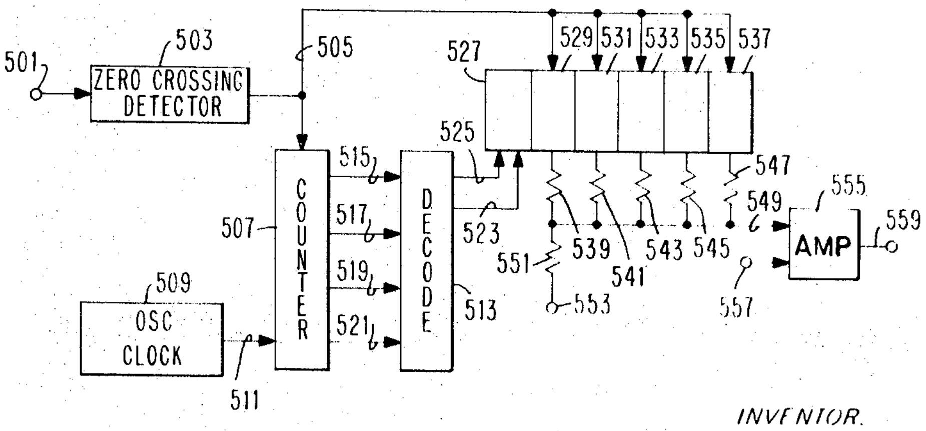
FIG. 2 shows another embodiment using a special pulse generating circuit which is responsive to each half cycle of the input signal, in conjunction with one frequency determining counter and the specially adapted digital matched filter.

Referring now to FIG. 2 of the drawings, an FSK signal such as shown in waveform C of FIG. 3 is applied at input 501 to a control means which includes a pulse generator for generating a pulse at a predetermined time during each half cycle of the FSK signal. The alternate embodiment being described, utilizes a pulse generator 503 which generates a pulse whenever the FSK signal crosses zero voltage, but other detection times could be employed as well. An example would be a peak detecting pulse generator which generates a pulse at each positive and each negative peak of the FSK signal. One example of a control means which could be used in this application shown in FIG. 3 of U.S. Pat. No. 3,202,834 issued to Carl O. Pingry III and George W. Hobgood. The output of zero crossing detector 503 appears on wire 505 and consists of a narrow control pulse which occurs everytime input signal 501 swings from a positive to a negative voltage or from a negative to a positive voltage. This control pulse is applied via wire 505 to the reset input of binary counter 507. Binary counter 507 is a four stage counter which is similar to binary counters 27 or 29 of FIG. 1 with the one exception being that an enable signal is not required to allow oscillator clock 509 to advance binary counter 507. Binary counter 507 is advanced one integer for each clock cycle, whenever reset input 505 is not at a positive digital level. Binary counters 27 or 29 could be adapted to perform the function of binary counter 507 by merely connecting their enable gates to a fixed positive digital voltage source, thus rendering them continuously enabled. Each of the four counting stages of binary counter 507 is connected to decode 513 via wires 515, 517, 519, and 521. Decode 513 is identical to decodes 61 or 63 of FIG, 1. The first control pulse on wire 505 resets counter 507 to a binary zero. This binary zero is recognized by decode 513 which provides an output on wire 523 to reset latch 527. As soon as the control pulse on wire 505 returns to a negative digital level, oscillator clock 509 will begin to advance counter 507. If the input frequency on wire 501 is a mark frequency, the time required for each half cycle will be long enough to allow binary counter 507 to advance through a count of 13. When a binary count of 13 exists in counter 507 it will be recognized by decode 513 and an output signal will appear on wire 525 to set latch 527. If a space frequency is being received at wire 501, the time between each zero crossing, which is the same as the time for each half cycle, will be less than the time required to advance binary counter 507 through a count of 13 before it is reset by the next zero crossing control pulse on wire 505. Thus we see that if a space frequency is being received, latch 527 will not be set. The on and off outputs of latch 527 are connected to the gate inputs of shift register stage 529. In a similar manner the outputs of stage 529 are connected to stage 533, stage 533 is connected to stage 535, and stage 535 is connected to stage 537. The shift input to shift register stages 529, 531, 533, 535, and 537 are all connected to wire 505, so that whenever a zero crossing control pulse occurs, the information which existed in stage 529 is shifted into stage 531 and so on. Each shift register stage 529 through 537 has a resistor associated with its on output. Resistor 539 is connected to the on output of stage 529, 541 is connected to 531, 543 is connected to the on output stage 537. The opposite terminals of resistors 539 through 547 are all connected together by wire 549 and are also connected to one terminal of resistor 551. The opposite terminal of resistor 551 is connected to a zero reference voltage source 553. Wire 549 is also connected to the noninverting input of differential amplifier 555. The inverting input of differential amplifier 555 is connected to reference voltage source 557. Reference voltage 557, like reference voltage 107 of FIG. 1, usually is halfway between voltage source 553 and a positive digital level, and may be generated with a resistor voltage divider network if desired. Resistors 539 through 547 and resistor 551 are chosen such that whenever three or more shift register stages 529 through 537 are in the on condition, indicating that the mark frequency $F_m$ has been received for three or more half cycles, the voltage on wire 549 will be above reference voltage 557. Whenever three or more of shift register stages 529 through 537 are in the off condition, indicating that a space frequency $F_s$ has been received for three or more half cycles, the voltage at wire 549 will be less than reference voltage 557, and a negative level will appear on output wire 559. The demodulated FSK output signal appearing on wire 559 can be connected to a timing recovery circuit such as timing recovery 201 in FIG. 1 which will generate a series of pulses which can be used to accurately extract the digital information from the FSK demodulated signal appearing at wire 559.

Although only two particular circuits have been described and shown in FIGS. 1 and 2, it will be appreciated that various alternative arrangements can be used in the practice of the present invention. By way of example, the oscillator clock shown as part of the detector may be eliminated and the master clock of the utilizing system may be employed in its place, or the counting type detector may be replaced with a time delay type such as disclosed by R. W. Calfee in U.S. Pat. No. 3,233,181.

While the invention has been particularly shown with reference to preferred embodiments thereof, it will be understood by those skilled in the art that the foregoing and other changes in form and details may be made therein without departing from the spirit and scope of the invention.

What is claimed is:

1. A digital demodulator for demodulating a frequency shift keyed input signal, comprising;

control means for receiving said input signal and converting said input signal to a bilevel frequency modulated signal;

detecting means connected to output of said control means for converting said bilevel frequency modulated signal to a bilevel amplitude modulated signal;

majority decision filtering means connected to the output of said detecting means, for substantially eliminating all unwanted bilevel amplitude components of said bilevel amplitude modulated signal.

2. A digital demodulator as in claim 1 wherein said majority decision filtering means contains storage means for storing a number of successive bilevel output pulses from said detecting means, and for providing a single bilevel output pulse whose level is determined by the majority of bilevel output pulses stored in said storage means.

3. A digital demodulator as in claim 2 wherein said control means includes a pulse generating means for generating an output control pulse at a predetermined time during each half cycle of said input signal.

4. A digital demodulator as in claim 3 wherein said detection means includes time measuring means, the output of said detection means being set to a first digital level by said control pulse, said output of said detection means being set to a second digital level by said time measuring means after passage of a predetermined amount of time, said output of said detection means remaining at said first digital level when said control pulse reoccurs before passage of said predetermined amount of time.

5. A digital demodulator as set forth in claim 4 wherein said majority decision filtering means is connected to said control means and is controlled by said control pulse, for storing a successive plurality of said outputs from said detection means into said storage means, each of said control pulses controlling said storage means to place the present output of said detection means into said storage means, and to remove from storage within said storage means, that output of said detection means which has been stored therein for the longest period of time, said majority decision filtering means having an output which is in a first logical condition whenever the majority of stored outputs from said detection means are at a first digital level, said output of said majority decision filtering means being at a second logical condition whenever the majority of said stored outputs from said detection means are at a second digital level.

6. A digital demodulator as set forth in claim 5 wherein said detection means further comprises:

clock means, for providing clock pulses at a frequency which is higher than the highest frequency of said input signal;

counting means advanced by said clock pulses and reset by said control pulses;

decode means connected to the output of said counting means having an output, said output being a first digital level whenever the count generated by said counting means has exceeded a predetermined number, and said output being a second digital level at all other times.

7. A digital demodulator as set forth in claim 6 wherein said majority decision filtering means further comprises:

shift register storage means having a data input connected to the output of said decision means, and having a shift input connected to said output of said control means;

majority decision means connected to the output of each stage of said shift register storage means, said majority decision means having an output which is a logical one output whenever the majority of said stages contain said second signal.

8. A digital demodulator for demodulating frequency shift keyed input signals as set forth in claim 2 wherein said receiving means comprises:

limiting means for receiving the input signal and providing a bilevel signal, said bilevel signal being at a first digital level during each positive half cycle of said input signal, and said bilevel signal being at a second digital level during each negative half cycle of said input signals;

inverting means connected to said limiting means for providing an inverse bilevel signal, said inverse bilevel signal being at said first digital level whenever said bilevel signal is at said second digital level and said inverse bilevel signal being at said second digital level whenever said bilevel signal is at said first digital level.

9. A digital demodulator as in claim 8 wherein said detection means further comprises:

clock means for providing clock pulses at a frequency which is higher than the highest frequency of said input signal;

first counting means connected to said limiting means, said inverting means, and said clock means, each of said clock pulses advancing the count of said first counting means, whenever said bilevel signal is at said first digital level, and said count of said first counting means returning to zero whenever said inverse bilevel signal is at said first digital level;

second counting means connected to said limiting means, said inverting means, and said clock means, each of said clock pulses advancing the count of said second counting means whenever said inverse bilevel signal is at said first digital level, and said count of said second counting means returning to zero whenever said bilevel signal is at said first digital level;

first decode means connected to said first counting means for setting a first storage circuit to a first logical state when said count of said first counting means has reached a predetermined number, said first storage circuit remaining in said first logical state until reset to a second logical state by said first decode when said count of said first counting means equals zero;

second decode means connected to said second counting means for setting a second storage circuit to said first logical state when said count of said second counting means has reached said predetermined number, said second storage circuit remaining in said first logical state until reset to said second logical state by said second decode when said count of said second counting means equals zero.

10. A digital demodulator as in claim 9 wherein said majority decision means further comprises:

shift register storage means connected to said first storage circuit, said second storage circuit, said limiting means and said inverting means, said logical state of said first storage circuit being shifted into said shift register whenever said inverse bilevel signal transfers from said second digital level to said first digital level, said logical state of said second storage circuit being shifted into said shift register whenever said bilevel signal transfers from said second digital level to said first digital level;

majority decision means connected to each stage of said shift register, said majority decision means providing an output at said first voltage whenever the majority of said stages of said shift register are at said first state, said output of said majority decision means being at said second voltage whenever the majority of said stages of said shift register are at said second state.